United States Patent
Lim

(10) Patent No.: US 8,284,325 B2
(45) Date of Patent: Oct. 9, 2012

(54) BROADCAST RECEIVER AND CHANNEL SEARCHING METHOD USING THE SAME

(75) Inventor: Hyun Woo Lim, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 385 days.

(21) Appl. No.: 12/442,910

(22) PCT Filed: Apr. 17, 2008

(86) PCT No.: PCT/KR2008/002184
§ 371 (c)(1),
(2), (4) Date: Mar. 25, 2009

(87) PCT Pub. No.: WO2008/130141
PCT Pub. Date: Oct. 30, 2008

(65) Prior Publication Data
US 2010/0074373 A1    Mar. 25, 2010

(30) Foreign Application Priority Data

Apr. 20, 2007  (KR) .................... 10-2007-0038757

(51) Int. Cl.
*H04N 5/50* (2006.01)
(52) U.S. Cl. ........................................ 348/731
(58) Field of Classification Search .............. 348/732, 348/731, 725, 500, 510, 528, 571, 726; 725/131, 725/139, 151
See application file for complete search history.

(56) References Cited

U.S. PATENT DOCUMENTS

| | | | |
|---|---|---|---|
| 4,079,329 A * | 3/1978 | England et al. | 329/309 |
| 6,396,354 B1 * | 5/2002 | Murayama et al. | 331/17 |
| 6,891,841 B2 * | 5/2005 | Leatherbury et al. | 370/401 |
| 7,053,827 B2 * | 5/2006 | Awata | 342/357.68 |
| 7,113,230 B1 * | 9/2006 | Genovese et al. | 348/731 |
| 7,447,489 B2 * | 11/2008 | Lim | 455/191.1 |
| 7,685,624 B2 * | 3/2010 | Oishi | 725/85 |
| 2003/0200944 A1 * | 10/2003 | Takahashi et al. | 123/90.15 |
| 2006/0156369 A1 | 7/2006 | Oishi | |
| 2007/0146553 A1 * | 6/2007 | Mori et al. | 348/731 |
| 2007/0146555 A1 * | 6/2007 | Wada | 348/732 |
| 2007/0288983 A1 * | 12/2007 | Ota et al. | 725/131 |
| 2008/0225170 A1 * | 9/2008 | Silver et al. | 348/555 |
| 2008/0225175 A1 * | 9/2008 | Shyshkin et al. | 348/572 |
| 2008/0225176 A1 * | 9/2008 | Selby et al. | 348/572 |
| 2008/0225182 A1 * | 9/2008 | Silver et al. | 348/726 |

FOREIGN PATENT DOCUMENTS

| | | | |
|---|---|---|---|
| KR | 10-2006-0069218 A | | 6/2006 |
| WO | WO-2006-025544 A | | 3/2006 |

* cited by examiner

*Primary Examiner* — Paulos Natnael
(74) *Attorney, Agent, or Firm* — Saliwanchik, Lloyd & Eisenschenk

(57) ABSTRACT

Disclosed is a broadcast receiver. The broadcast receiver comprises a signal receiver for tuning and outputting a Q channel of a digital broadcasting signal, a demodulator for demodulating a signal of the received channel and checking a lock state M or an unlock state of a gain control signal and a timing control signal of the channel, and a demodulation controller for controlling o an operation of the demodulator and detecting a lock state of the channel based on the lock state of the gain control signal and the timing control signal.

17 Claims, 2 Drawing Sheets

[Fig. 1]
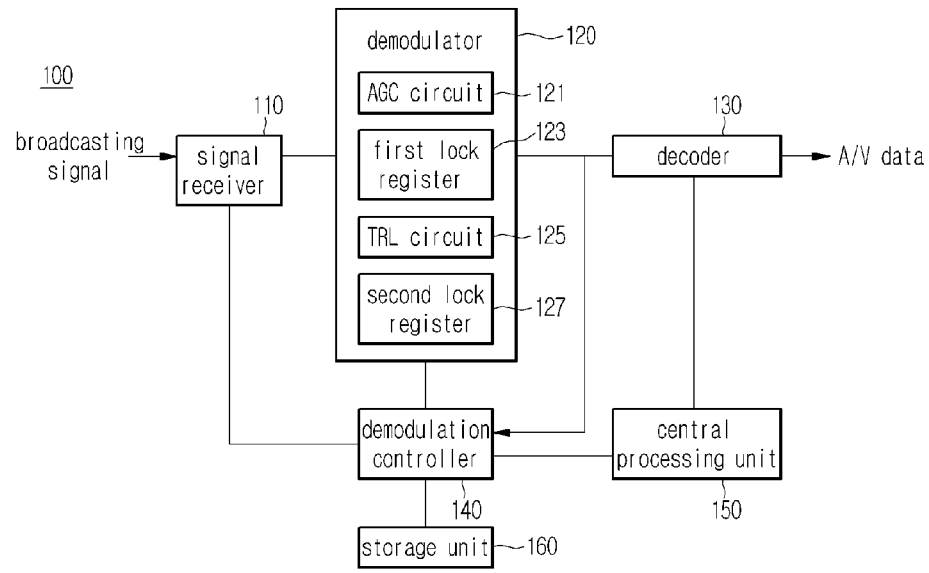
[Fig. 2]
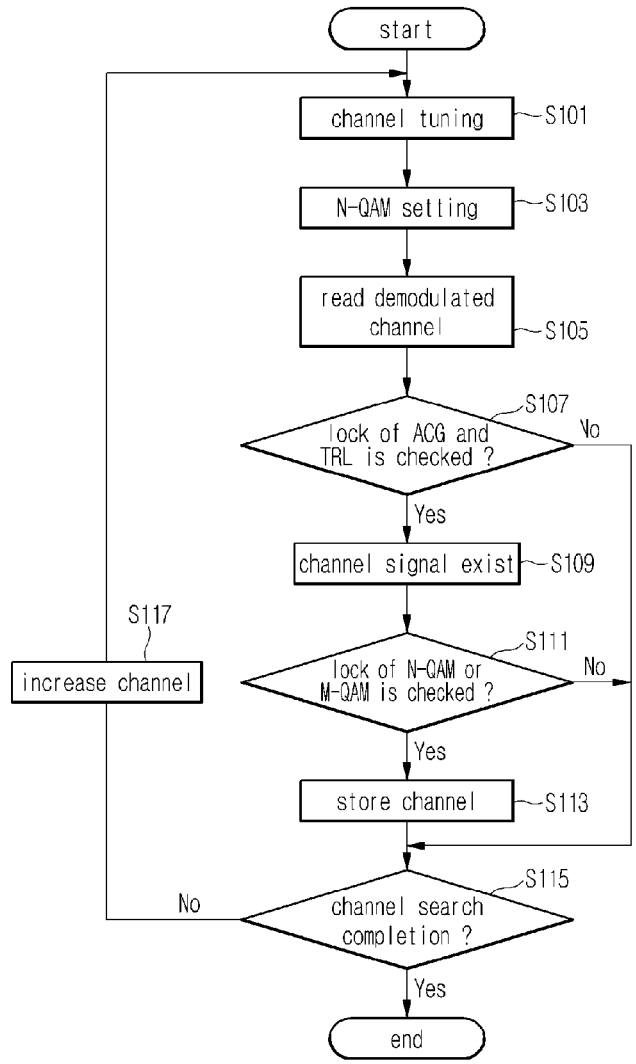

[Fig. 3]
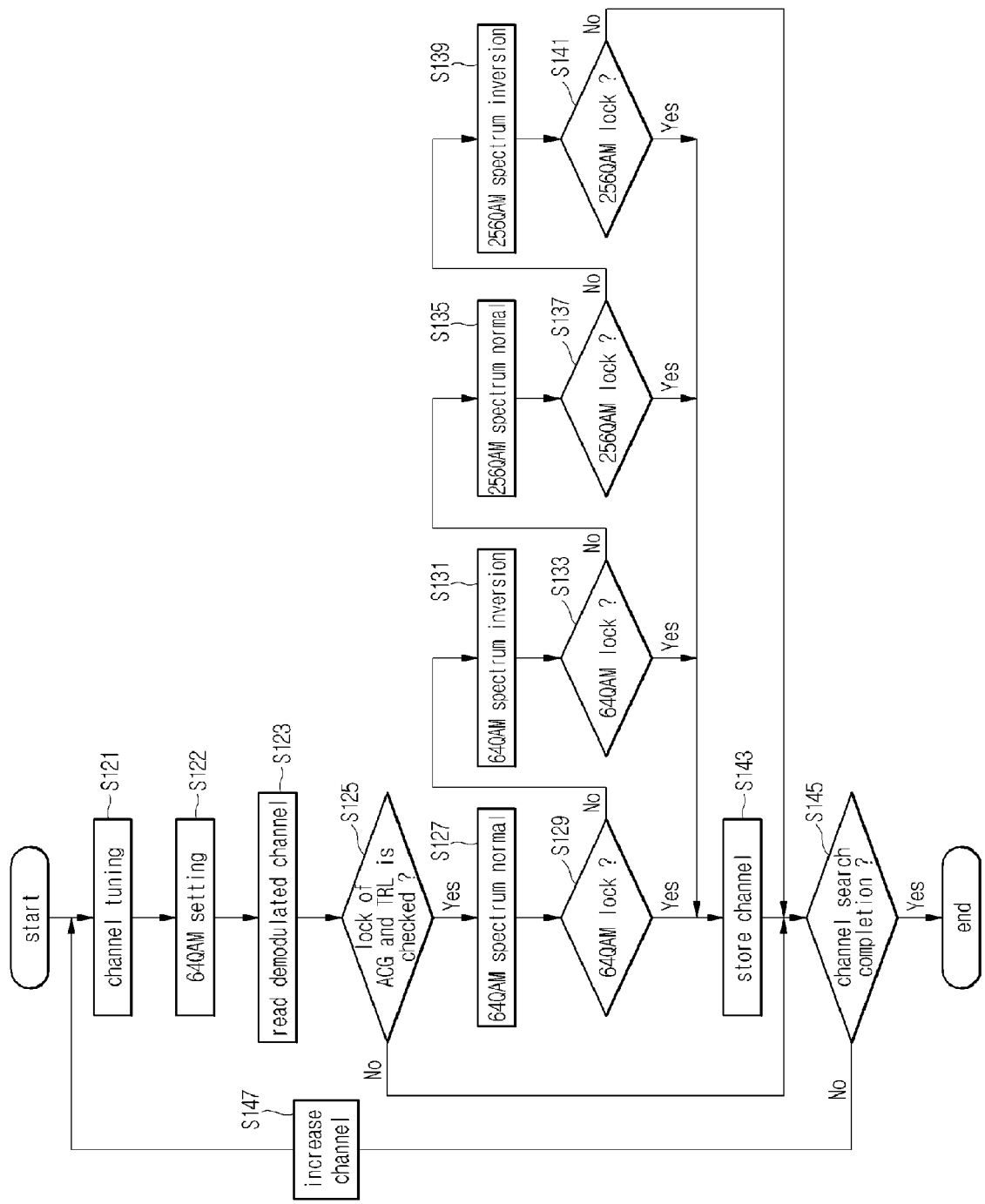

BROADCAST RECEIVER AND CHANNEL SEARCHING METHOD USING THE SAME

CROSS-REFERENCE TO RELATED APPLICATION

This application is the U.S. national stage application of International Patent Application No. PCT/KR2008/002184, filed Apr. 17, 2008, the disclosure of which is hereby incorporated by reference in its entirety.

TECHNICAL FIELD

The embodiment relates to a broadcast receiver and a channel search method using the same.

BACKGROUND ART

A broadcast receiving system, such as a cable modem, a digital TV, an analog TV and a set-top box, receives a broadcasting signal including channel information or broadcast information (video information and audio information) from a head end or a broadcasting station.

The broadcast receiving system scans a channel including the received broadcasting signal to acquire various broadcast information and channel information such as terrestrial broadcast information or satellite broadcast information, and stores the acquired channel information, thereby allowing a user to exactly select channels. Such channel information can be acquired through an automatic channel search function.

When an automatic channel search function is initially set in a broadcast system such as a TV or a set-top box for convenience of a user, channel information received from a head-end or a broadcasting station is scanned and channel information including broadcast information is stored.

DISCLOSURE OF INVENTION

Technical Problem

The embodiment provides a broadcast receiver capable of determining an existence of a digital broadcast channel by checking an AGC (automatic gain control) signal and a TRL (timing recovery loop) signal, and a channel search method using the same.

The embodiment provides a broadcast receiver capable of reducing automatic channel search time by skipping a signal having no digital broadcasting signal, and a channel search method using the same.

Technical Solution

The embodiment provides a broadcast receiver comprising: a signal receiver for tuning and outputting a channel of a digital broadcasting signal; a demodulator for demodulating a signal of the received channel and checking a lock state or an unlock state of a gain control signal and a timing control signal of the channel; and a demodulation controller for controlling an operation of the demodulator and detecting a lock state of the channel based on the lock state of the gain control signal and the timing control signal.

The embodiment provides a broadcast receiver comprising: a signal receiver for tuning a signal of a digital cable broadcasting channel and converting the signal into an intermediate frequency; a demodulator for demodulating a signal of the channel and checking a lock state of the channel by using AGC and TRL signals of the received channel; a storage unit for storing channel information; and a demodulation controller for storing channel information, which is generated by the demodulator based on the lock state of the channel, in the storage unit.

The embodiment provides a channel search method comprising: tuning a channel of a digital broadcasting signal; demodulating a signal of the channel; checking a lock state or an unlock state of the channel according to signal intensity of the tuned channel and signal timing; storing one channel of a digital broadcasting format when the channel is in a lock state; and skipping the channel and searching for a subsequent channel when the channel is not in the lock state.

Advantageous Effects

The embodiment can reduce automatic channel search time by skipping a channel, from which digital broadcasting signals are not detected, by using a gain control signal and a timing recovery signal.

The embodiment can shorten time required for obtaining channel information in digital cable broadcasting.

The embodiment can improve reliability of a receiver that receives digital cable broadcasting.

BRIEF DESCRIPTION OF THE DRAWINGS

FIG. 1 is a block diagram showing the construction of a broadcast receiver according to an embodiment;

FIG. 2 is a flowchart illustrating a channel search method using FIG. 1; and FIG. 3 is a flowchart illustrating one example of the channel search method of FIG. 2.

BEST MODE FOR CARRYING OUT THE INVENTION

Hereinafter, a broadcast receiver will be described with reference to accompanying drawings.

FIG. 1 is a block diagram showing the construction of the broadcast receiver according to an embodiment.

Referring to FIG. 1, the broadcast receiver 100 comprises a signal receiver 110, a demodulator 120, a decoder 130, a demodulation controller 140, a central processing unit 150 and a storage unit 160.

The signal receiver 110 receives signals selected by a user from broadcasting signals transmitted through wired or wire medium. The signal receiver 110 comprises an antenna, which detects public broadcasting signals, and a tuner that tunes signals of a desired channel from various broadcasting signals to convert the selected signals into an intermediate frequency. Further, the signal receiver 110 comprises a cable modem or a set-top box that receives digital cable broadcasting. In the embodiment, a set-top box or a TV that receives digital cable broadcasting will be described.

In the case of digital broadcasting, it is necessary to modulate base-bands of original video signals and audio signals to transmit the signals through a cable, terrestrial wave or satellite wave. A digital modulation scheme comprises QAM (quadrature amplitude modulation), QPSK (quadrature phase shift keying), COFDM (coded orthogonal frequency division multiplexing) and the like. The QAM is mainly used for digital cable broadcasting and is classified into QAM64, QAM256 and QAM1024 according to a format. The QPSK is used for a return channel and the like in cable broadcasting. The COFDM is used for terrestrial broadcasting or MMDS (microwave multipoint distribution services) in Europe.

The QAM modulation scheme may have various levels (4, 16, 32, 64, 128, 256, 512 and 1024) that provide 2, 4, 5, 6, 7, 8, 9, and 10 Mbit/s/MHz, respectively. This scheme provides about 42 Mbit/s (QAM256) through a CATV channel of 6 MHz in U.S.A. and 56 Mbit/s through a CATV channel of 8 MHz in Europe.

Further, the QAM format has been extensively used for various fields including digital cable broadcasting, and has been adopted by DVB (digital video broadcasting), DAVIC (digital audio visual council) and MCNS (multimedia cable network system) standardization body. The QAM format is used for transmitting digital TV signals through a coaxial cable, a HFC (hybrid fiber coaxial cable) and an MMDS (microwave multipoint distribution system) TV network.

The signal receiver 110 tunes a predetermined channel from a transport stream received through the digital cable, converts signals of the tuned channel into an intermediate frequency and outputs the intermediate frequency to the demodulator 120. At this time, the broadcasting signals provided to the modulator 120 are compensated for at a predetermined level by AGC (Automatic gain control) and then outputted.

The demodulator 120 demodulates the intermediate frequency signal received from the signal receiver 110 into a baseband signal. Such a demodulator 120 demodulates digital signals by using various demodulation schemes such as a VSB-8, a VSB-16, a QAM64, a QAM256, a QAM1024, a DPSK and a QPSK EMD.

A terrestrial broadcasting provider or a cable broadcasting provider transmits digital broadcasting signals by using a VSB demodulation scheme or a QAM demodulation scheme. At this time, the terrestrial broadcasting provider or the cable broadcasting provider can transmit the digital broadcasting signals by using VSB or QAM modulation scheme. In the case of the VSB modulation scheme, 8VSB and 16VSB are available. In addition, in the case of the QAM modulation scheme, 64QAM and 256QAM are available. Further, many broadcasting stations may use various types of modulation schemes and one broadcasting station may select various modulation schemes suitable for broadcasting contents. Thus, when a user wants to watch many broadcasting programs, which have been modulated by modulation schemes different from each other, through a digital broadcasting receiver, the digital broadcasting receiver must demodulate broadcasting signals while searching for demodulation schemes corresponding to modulation schemes of the broadcasting programs. In the embodiment, the QAM demodulation scheme will be described.

At this time, an index can be assigned to a demodulation scheme such as a QAM64, a QAM256 and a QAM1024 such that the broadcast receiver 100 can find a proper demodulation scheme from signals inputted in the sequence of the index. Such an index setting may be changed.

The demodulator 120 can store information of each channel by efficiently performing channel search relative to signals received with the QAM format. The signals with the QAM format exist in four modes according to a modulation scheme and spectrum inversion. The four modes include 64QAM spectrum normal, 64QAM spectrum inversion, 256QAM spectrum normal and 256QAM spectrum inversion. The spectrum normal represents a normal signal in which an I signal component is not replaced with a Q signal component. The spectrum inversion represents a received signal in which an I signal component is replaced with a Q signal component.

The demodulator 120 comprises a demodulation chip (IC) and demodulates a broadcasting signal into a baseband signal having an I and Q signal components. The decoder 130 outputs audio, video and data signals by channel-decoding the demodulated baseband signal.

The demodulation controller 140 is controlled by the central processing unit 150 and provides the signal receiver 110 with a locking control signal comprising information on a frequency that must be locked. Further, if a broadcasting signal of a channel is obtained in the demodulation process of the demodulator 120, the demodulation controller 140 stores the channel information in the storage unit 160.

The demodulation controller 140 receives the intensity of a broadcasting signal outputted from the demodulator 120, and transfers the intensity to the demodulator 120.

At this time, the central processing unit 150 sets a demodulation scheme of the demodulator 120 through the demodulation controller 140 by a channel search command of a user. The demodulation scheme may include a 64QAM, a 256QAM and a 1024QAM. Such a central processing unit 150 controls the entire system of the broadcast receiver and can be prepared in the form of a CPU. In FIG. 1, the decoder 130 and the central processing unit 150 are separately provided. However, the central processing unit 150 can be embedded in the decoder 130 in order to increase the processing speed and performance.

Meanwhile, the demodulator 120 comprises an AGC circuit 121, a first lock register 123, a TRL circuit 125 and a second lock register 127. In FIG. 1, the AGC circuit 121 and the TRL circuit 125 are included in the demodulator 120. However, the scope of the present invention is not limited thereto.

The AGC circuit 121 performs an IF AGC function, and compensates for a broadcasting signal at a signal level, which can be demodulated by the demodulator 120, by using a control signal transferred from the demodulation controller 140.

If a broadcasting signal does not exist in a channel received in the signal receiver 110, the signal receiver 110 converts weak noise into an intermediate frequency, amplifies the intermediate frequency and transmits the intermediate frequency to the demodulator 120. If an IF broadcasting signal does not exist in the channel, since the AGC circuit 121 of the demodulator 120 cannot compensate for the signal by a predetermined signal level, an output value of the AGC circuit 121 does not reach a preset signal level. The first lock register 123 stores lock or unlock state information of a channel based on an output level state of the AGC circuit 121. An AGC signal of the AGC circuit 121 is the first criterion for determining if a broadcasting signal exists in the channel.

The TRL circuit 125 controls a bit or a symbol shifted in the channel transmission process, and adjusts locks of signals by exactly estimating a shifted time point of a bit or a symbol based on received data. Further, the TRL circuit 125 receives a baseband signal having I and Q signal components and synchronizes the received signal with a symbol of an input signal in terms of timing.

When it is determined that the timing synchronization is achieved in the demodulator 120, the TRL circuit 125 stores a lock state of the channel in the second lock register 127. The lock information of the second lock register 127 is the second criterion for determining if a broadcasting signal exists in the channel.

When the broadcasting signal exists in the channel, such lock state information of the TRL signal is used for preventing an analog signal, other than a digital broadcasting signal, from being checked as a lock state. Thus, when a signal of a channel including the AGC signal is an analog signal, the TRL circuit 125 stores an unlock state of the channel in the second lock register 127. Thus, the TRL circuit 125 can exactly determine an existence of a signal with a QAM format although an input signal is offset.

The demodulation controller 140 detects lock states of the channel stored in the first and second lock registers 123 and 127, and outputs a demodulation control signal to the demodulator 120. The demodulator 120 demodulates a received broadcasting signal to generate channel information. Thus, the demodulation controller 140 can skip a signal of a channel, which is not checked as the lock state, so that channel search time can be reduced.

The demodulation controller 140 stores the generated channel information in the storage unit 160. The storage unit 160 can be prepared in the form of a flash RAM or an EEPROM.

FIG. 2 is a flowchart illustrating a channel search method according to the embodiment. The channel search method will be described with reference to the elements of the broadcast receiver 100 of FIG. 1.

Referring to FIG. 2, if an automatic channel search command is received from a user, the central processing unit 150 transmits the channel search command to the demodulation controller 140. The demodulation controller 140 provides the signal receiver 110 with a locking control signal including information on a frequency that must be locked.

The signal receiver 110 tunes channels of received signals based on the locking control signal, converts the signal of the tuned channel into an intermediate frequency, and amplifies the intermediate frequency at a predetermined level to output the amplified intermediate frequency to the demodulator 120 (S101).

The demodulation controller 140 sets an N-QAM demodulation scheme (N is 64 or 256), e.g. 64QAM or 256QAM format, in the demodulator 120 (S103). Between the 64QAM and the 256QAM formats, one format having many broadcasting channels may be searched prior to the other format. The scope of the present invention is not limited thereto.

The demodulator 120 demodulates the signal of the channel. In detail, the demodulator 120 demodulates the signal into a baseband signal having I and Q signal components. The demodulator 120 reads such demodulation channel signal to perform AGC and TRL functions (S105).

At this time, the AGC circuit 121 of the demodulator 120 compensates for the AGC signal level of the channel. If the output level of the AGC circuit 121 reaches a predetermined level, the first lock register 123 stores the lock state of the channel. However, if the output level of the AGC circuit 121 does not reach the predetermined level, the first lock register 123 stores an unlock state of the channel. In detail, when a broadcasting signal does not exist in the channel, since the AGC signal does not exist, an existence of the signal of the channel can be determined.

Further, the TRL circuit 125 of the demodulator 120 performs timing synchronization relative to a symbol of the received channel. At this time, the second lock register 127 records a lock state or an unlock state of the channel according to whether timing synchronization of the baseband signal has been achieved.

The TRL lock state is checked as describe above, so that an analog signal, other than a digital broadcasting signal, can be prevented from being checked as a lock state when the broadcasting signal exists in the channel. Thus, when the signal of the channel having the AGC signal is an analog signal, the TRL circuit 125 stores an unlock state of the channel.

The demodulation controller 140 checks a lock state of the AGC signal of the first lock register 123 and a lock state of the TRL signal of the second lock register 127 (S107). If the AGC and TRL signals of the received channel have been checked as lock states, the demodulation controller 140 determines that a digital broadcasting signal exists in the channel (S109).

Then, the demodulation controller 140 checks a lock state of an N-QAM or an M-QAM relative to the demodulated channel to store the generated channel information (S111 and S113). Here, if the N is 64, M is 256. If the N is 256, M is 64. In the embodiment, two QAM formats are searched. Further, three or more QAM formats such as 64QAM, 256QAM and 1024QAM may be searched.

In step 107, if the AGC and TRL signals of the received channel have not been checked as the lock state, the demodulation controller 140 skips the signal of the channel and then determines if channel search has been completed (S115). If the channel search has not been completed, the demodulation controller 140 increases a channel (S117) and searches for a subsequent channel. Thus, when a broadcasting signal does not exist in the channel or when the broadcasting signal exists in the channel but the signal is an analog signal, the channel is skipped, so that an existence of a QAM signal can be determined in a short time. Further, when the broadcasting signal does not exist in the channel, the channel is skipped without checking 64QAM spectrum normal, 64QAM spectrum inversion, 256QAM spectrum normal and 256QAM spectrum inversion, so that the channel search time can be reduced.

The channel search is repeated in such a sequence and a channel is increased (S117). Then, the process is performed relative to the final channel. If the final channel is searched, the demodulation controller 140 notifies the signal receiver 110 of channel search completion, and completes the channel search.

According to the channel search process of the broadcast receiver, a channel having no digital broadcasting signal is skipped in a short time, so that time for automatically searching for the total channels can be reduced.

FIG. 3 is a flowchart illustrating one example of the broadcasting channel search method of FIG. 2. Such a search method will be described as an example of a channel search process of 64QAM and 256QAM.

Referring to FIG. 3, channel tuning is performed by the signal receiver (S121) and a 64QAM demodulation scheme is set in the demodulator (S122).

If the demodulator demodulates a signal of the tuned channel, the signal of the demodulated channel is read (S123). At this time, lock states of AGC and TRL signals are checked when the signal of the channel is demodulated (S125). In detail, it is determined if the lock states of AGC and TRL signals have been checked, so that an existence of a digital broadcasting signal in the tuned channel is determined.

When the signal does not exist in the received channel, step 145 is performed, in which it is determined if the channel search has been completed. In detail, a channel having no digital signal is not searched, but skipped in the following four modes. Thus, the channel search time can be reduced.

From the result of step 125, if the lock states of AGC and TRL signals have been checked, it is determined if 64QAM spectrum normal is in a lock state (S127 and S129). If the 64QAM spectrum normal is in the lock state, the channel is stored (S143). If the 64QAM spectrum normal is in an unlock state, it is determined if 64QAM spectrum inversion is in a lock state (S131 and S133). If the 64QAM spectrum inversion is in the lock state, the channel is stored (S143). If the 64QAM spectrum inversion is in an unlock state, it is determined if 256QAM spectrum normal is in a lock state (S135 and S137). If the 256QAM spectrum normal is in the lock state, the channel is stored (S143). If the 256QAM spectrum normal is in an unlock state, it is determined if 256QAM spectrum inversion is in a lock state (S139 and S141). If the 256QAM spectrum inversion is in the lock state, the channel is stored (S143).

The lock state is checked in the 64QAM spectrum normal, 64QAM spectrum inversion, 256QAM spectrum normal and 256QAM spectrum inversion modes, so that lock states of 5 channels in each mode are recorded by program.

If the 256QAM spectrum inversion is not in the lock state, a signal of a corresponding channel is skipped. Then, it is determined if the channel search has been completed (S145). If the channel search has not been completed, a channel is increased (S147). Then, a subsequent channel is searched. According to such a channel search method, a channel, other than an effective QAM channel, is skipped, so that the channel search time can be reduced.

Although embodiments have been described with reference to a number of illustrative embodiments thereof, it should be understood that numerous other modifications and embodiments can be devised by those skilled in the art that will fall within the spirit and scope of the principles of this disclosure.

INDUSTRIAL APPLICABILITY

The embodiment can reduce automatic channel search time by skipping a channel, from which digital broadcasting signals are not detected, by using a gain control signal and a timing recovery signal.

The embodiment can shorten time required for obtaining channel information in digital cable broadcasting.

The embodiment can improve reliability of a receiver that receives digital cable broadcasting.

The invention claimed is:

1. A broadcast receiver comprising:
a signal receiver for tuning and outputting a channel of a digital broadcasting signal;
a demodulator for demodulating a signal of the received channel and checking a lock state or an unlock state of a gain control signal and a timing control signal of the channel; and
a demodulation controller for controlling an operation of the demodulator and detecting a lock state of the channel based on the lock state of the gain control signal and the timing control signal;
wherein the demodulation controller checks a lock state of an automatic gain control signal and a lock state of a timing recovery loop to skip a channel signal in an unlock state, and then searches for a subsequent channel.

2. The broadcast receiver as claimed in claim 1, comprising a decoder for decoding a signal of the demodulated channel.

3. The broadcast receiver as claimed in claim 1, comprising a storage unit for storing information of the demodulated channel, and the demodulation controller controls the demodulator, the signal receiver and the storage unit.

4. The broadcast receiver as claimed in claim 1, wherein the signal receiver comprises a tuner and receives the signal through one of a coaxial cable, a HFC (hybrid fiber coaxial cable) and an MMDS (microwave multipoint distribution system) TV network.

5. The broadcast receiver as claimed in claim 1, wherein the demodulator demodulates a signal, which is modulated in 64QAM, 256QAM and 1024QAM formats, of the digital broadcasting signal.

6. The broadcast receiver as claimed in claim 1, wherein the demodulator comprises:
an AGC circuit for compensating for a signal level of the channel at a predetermined level;
a first lock register for storing a lock state or an unlock state of the AGC signal according to the signal level of the channel compensated by the AGC circuit;
a TRL (timing recovery loop) circuit for recovering timing of the demodulated signal; and
a second lock register for storing a lock state or an unlock state of the TRL signal of the channel according to the signal timing of the TRL circuit.

7. The broadcast receiver as claimed in claim 1, comprising a central processing unit for transferring an automatic channel search command to the demodulation controller.

8. The broadcast receiver as claimed in claim 1, wherein the demodulation controller controls the signal receiver and the demodulator such that demodulation is performed in a preset sequence of 64QAM, 256QAM and 1024QAM formats.

9. The broadcast receiver as claimed in claim 1, wherein the demodulation controller checks a lock state of a channel in a sequence of 64QAM spectrum normal, 64QAM spectrum inversion, 256QAM spectrum normal and 256QAM spectrum inversion modes.

10. A broadcast receiver comprising:
a signal receiver for tuning a signal of a digital cable broadcasting channel and converting the signal into an intermediate frequency;
a demodulator for demodulating a signal of the channel and checking a lock state of the channel by using automatic gain control and timing recovery loop signals of the received channel;
a storage unit for storing channel information; and
a demodulation controller for storing channel information, which is generated by the demodulator based on the lock state of the channel, in the storage unit;
wherein, when the automatic gain control and timing recovery loop signals of the received channel are in an unlock state, the demodulation controller skips the channel and controls the signal receiver to tune a subsequent channel.

11. The broadcast receiver as claimed in claim 10, wherein the demodulation controller controls a channel having no digital broadcasting signal and an analog broadcasting channel as a skip channel.

12. The broadcast receiver as claimed in claim 10, wherein the demodulator demodulates a signal, which is modulated in 64QAM, 256QAM and 1024QAM formats, of the digital broadcasting signal.

13. The broadcast receiver as claimed in claim 10, wherein the demodulator comprises:
a first lock register for storing a lock state or an unlock state of the AGC signal of the channel; and
a second lock register for storing the lock state or the unlock state of the channel according to signal timing of the TRL signal.

14. A channel search method of a broadcast receiver, the method comprising the steps of:
tuning a channel of a digital broadcasting signal;
demodulating a signal of the channel;
checking a lock state or an unlock state of the channel according to signal intensity of the tuned channel and signal timing;
storing one channel of a digital broadcasting format when the channel is in a lock state; and
skipping the channel and searching for a subsequent channel when the channel is not in the lock state;
wherein the channel in the unlock state includes a channel having no digital broadcasting signal or an analog broadcasting channel.

15. The method as claimed in claim 14, wherein the channel is demodulated by at least one of 64QAM, 256QAM and 1024QAM formats of a digital cable modulation scheme.

16. The method as claimed in claim 14, wherein the channel is checked as the lock state when the signal intensity of the channel is a predetermined level, the channel is checked as the unlock state when the signal intensity of the channel is not he predetermined level, the channel is checked as the lock state when the signal of the channel synchronizes with timing of a TRL, and the channel is checked as the unlock state when the signal of the channel does not synchronize with the timing of the TRL.

17. The method as claimed in claim 14, wherein the channel checked as the lock state is checked in a sequence of 64QAM spectrum normal, 64QAM spectrum inversion, 256QAM spectrum normal and 256QAM spectrum inversion modes, and then stored.

* * * * *